(12) United States Patent
Saraie et al.

(10) Patent No.: US 9,757,829 B2
(45) Date of Patent: Sep. 12, 2017

(54) METHOD OF REINSTALLING OBJECT TO BE SUPPORTED

(71) Applicant: DMG MORI SEIKI CO., LTD., Nara (JP)

(72) Inventors: Hidenori Saraie, Nara (JP); Shigenori Jo, Nara (JP); Kinji Hashimoto, Nara (JP); Toshiya Sato, Nara (JP); Kazuo Yamazaki, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 487 days.

(21) Appl. No.: 14/448,008

(22) Filed: Jul. 31, 2014

(65) Prior Publication Data

US 2015/0033534 A1 Feb. 5, 2015

(30) Foreign Application Priority Data

Aug. 5, 2013 (JP) .................. 2013-162212

(51) Int. Cl.
*B23Q 1/00* (2006.01)
*B23P 19/04* (2006.01)
*B23Q 17/22* (2006.01)

(52) U.S. Cl.
CPC ............ *B23P 19/04* (2013.01); *B23Q 1/0054* (2013.01); *B23Q 17/22* (2013.01); *Y10T 29/49817* (2015.01)

(58) Field of Classification Search
CPC ....... B23P 19/04; B23Q 1/0054; B23Q 17/22; Y10T 29/49817
See application file for complete search history.

(56) References Cited

U.S. PATENT DOCUMENTS

2011/0146046 A1* 6/2011 Sievers ................ B64F 5/0081
  29/402.08
2013/0239639 A1* 9/2013 Okahisa ................ B25J 9/0048
  72/237

FOREIGN PATENT DOCUMENTS

JP  62156424  10/1987
JP  WO 2011111765 A1 * 9/2011  ............ B25J 9/0048

* cited by examiner

*Primary Examiner* — Sarang Afzali
*Assistant Examiner* — Ruth G Hidalgo-Hernandez
(74) *Attorney, Agent, or Firm* — Miller, Matthias & Hull LLP

(57) ABSTRACT

A reinstalling method which, when reinstalling an object to be supported, precisely restores the object to an initial installing state in a short period of time without requiring special skills. In a state before supporting of an object to be supported by support tools is released and in each of states in which the supporting is sequentially released, load acting on at least one support tool selected from among the support tools being in a supporting state is obtained. When reinstalling, the object is sequentially supported at the same positions as those before the release by the support tools in the reverse order to that of the release, and, a vertical-direction supporting position of each support tool is adjusted so that a load cell of the selected support tool detects the same value as the load obtained in the supporting state before the support tool was released.

6 Claims, 4 Drawing Sheets

METHOD OF REINSTALLING OBJECT TO BE SUPPORTED

BACKGROUND

Field of the Disclosure

The present disclosure relates to a method of supporting, by a plurality of support tools, an object to be supported, for example, an industrial machinery, such as a machine tool, an object to be machined by a machine tool, or the like, and more specifically relates to a method of releasing the supporting of the object by the support tools and then reinstalling the object at the same location or a different location by means of the support tools.

Background of the Disclosure

For example, when an object to be machined is machined using a machine tool such as a machining center, the following steps are performed: installing the object to be machined on a table of the machine tool using the support tools and machining the object; after detaching the machined object from the machine tool, in other words, after releasing the supporting of the machined object by the support tools, loading the detached machined object onto, for example, a three-dimensional measurement machine and measuring the machining accuracy of the machined object by the three-dimensional measurement machine; and reinstalling the object on the table of the machine tool to perform corrective machining in order to correct machining errors based on the measurement result.

Further, also as for industrial machinery, such as a machine tool, although it is installed at a desired location using the support tools, there are some cases where the necessity of reinstalling it occurs, such as, for example, a case where the installing location thereof is changed due to change of a production line or the like.

As such a method of installing an object to be supported, conventionally, there has been employed a mode which is performed using, for example, support tools having jack bolts, wherein, first, the object to be supported is placed on the support tools (reference support tools) positioned at three points serving as references, then the supporting states of the jack bolts of the reference support tools are adjusted so that a level placed on a reference surface of the object to be supported indicates approximately being horizontal, thereafter the object to be supported is supported by the other support tools at points other than the reference points, and the supporting states of the jack bolts of the other support tools are adjusted so that the reference surface is brought into a horizontal state.

In this mode, the operator has been required to perform a cumbersome operation in which the operator goes or goes back and forth around the object to be supported many times to adjust the supporting states of the support tools, that is, the fastening states of the jack bolts little by little so that the object to be supported is horizontally supported. Moreover, because this adjusting operation tends to be very empirical and is a sensory operation, there is also a fundamental problem that the operation requires skills.

Thus, the installing (including reinstalling) of the object to be supported using the support tools has had the problems that a long period of time is required and that empirical skills are required. Particularly, in the above-described case where, after the machined object is measured offline, the machined object is reinstalled on the machine tool to perform corrective machining, if the number of times of repetition of the reinstalling is increased, there is caused a problem that the machining efficiency is extremely deteriorated. Moreover, in order to perform such corrective machining with high accuracy, the object, when being reinstalled on the machine tool, has to be precisely restored to the state before it was detached from the machine tool. However, it has been extremely difficult to perform such precise restoration by the conventional sensory operation as described above.

Therefore, conventionally, as the above-described support tools, support tools disclosed in Japanese Unexamined Utility Model Application Publication No. S62-156424 have been suggested. Each of the support tools is provided with a weight scale and is configured to be capable of displaying an acting load. Because the value indicated by the weight scales of the support tools is obtained in an initial state where the object to be supported is supported using the support tools, at the time of readjusting the object to be supported after moving it and even when the level (horizontal state) thereof which has been adjusted once is changed due to another cause, it is possible to restore the supported state of the object to the initial state by adjusting the support tools so that the values indicated by the weight scales become the initial value.

SUMMARY OF THE DISCLOSURE

However, in the case where the above-described conventional support tools equipped with the weight scales are used, the operator can check loads acting on the support tools through the weight scales. In this sense, the operator is free from a sensory operation. Additionally, when the adjusted level is changed due to some reason, the object to be supported can be returned to the initial state comparatively easily by adjusting the support tools so that the weight scales of the support tools indicate the initial value. However, when the object to be supported is initially installed and when the object is reinstalled, the above-described problem that the adjustment has to be performed by going or going back and forth around the object to be supported many times is not solved at all only by providing the support tools with the weight scales.

That is, in Japanese Unexamined Utility Model Application Publication No. 562-156424, the support tools are adjusted so that the weight scales of the support tools indicate the same load, and, in a case where the center of gravity of the object to be supported is at the center of the object to be supported, the level of the object to be supported can possibly be adjusted by such adjustment. However, in most cases, the object to be supported does not have its center of gravity at its center, and, in a case of such an object to be supported, the loads acting on the support tools are not equal, and eventually it is not possible to adjust the level of the object to be supported using only the load value indicated by the weight scales as a reference. Therefore, even with the above-described conventional support tools, when the object to be supported is initially installed and when it is reinstalled, the above-described problem that the adjustment has to be performed by going or going back and forth around the object to be supported many times remains unsolved.

On the other hand, as for when the object to be supported is reinstalled, it may be conceivable that the object to be supported can be restored to the initial installing state by obtaining the load value indicated by the weight scale of each of the support tools in the initial installing state and adjusting, at the time of reinstalling the object to be supported, the support tools so that the weight scales of the support tools indicate their respective initial values. However, because the load acting on each support tool is changed every time the supporting state of another support tool is adjusted, the load acting on each support tool cannot be adjusted to the initial value by one adjustment. After all, the adjustment has to be performed by going or going back and forth around the object to be supported many times like the conventional manner The present disclosure has been achieved in view of the above-described circumstances, and an object thereof is to provide a reinstalling method enabling, when reinstalling an object to be supported, the object to be supported to be precisely restored to an initial installing state within a short period of time without requiring special skills.

The present disclosure, for solving the above-described problems, relates to:

a method of, by using at least three support tools, as reference support tools, among a plurality of support tools, each of which is configured to be adjustable in a vertical-direction supporting position and is provided with a load cell for detecting a support load, releasing supporting of an object to be supported being in a state of being supported by the reference support tools and other support tools other than the reference support tools so that a predetermined reference surface thereof is in a horizontal state, and then reinstalling the object to be supported at a same location or a different location, wherein:

first, in a state before the supporting by the other support tools is released and in each of states in which the supporting by the other support tools is sequentially released one by one, a load acting on at least one of the support tools selected from among the support tools being in a supporting state is obtained;

at the time of reinstalling the object to be supported, the object to be supported is supported at same positions as those before the release by the reference support tools so that the reference surface is brought into a horizontal state immediately before the reference support tools were released, and then the object to be supported is sequentially supported at same positions as those before the release by the other support tools in a reverse order to that of the release; and at the time of adjusting the vertical-direction supporting position of each of the support tools, the supporting position thereof is adjusted so that the load cell of the selected support tool detects a same value as the load obtained in the supporting state before the support tool was released.

As described above, the reinstalling method according to the present disclosure relates to a method of, after moving an object to be supported, which is in a state of being properly supported as appropriate by a plurality of support tools, to an appropriate desired location, reinstalling the object on the same location as that before moving it or on a different location. Note that, as a method of initially installing the object to be supported, for example, there is employed a method in which, a plurality of support tools each having a load cell for detecting a support load are used, the object to be supported is placed on the support tools positioned at three points serving as references (reference support tools) similarly to the conventional manner, and then the supporting states of the reference support tools in the vertical direction are adjusted so that a level placed on a reference surface of the object to be supported indicates approximately being horizontal, and thereafter, the object to be supported is supported by the other support tools at points other than the three points, and the supporting states of the other support tools in the vertical direction are adjusted so that the reference surface is brought into a horizontal state. Further, four or more reference support tools may be used. However, since a plane is stabilized by three points, normally, three support tools are used as the reference support tools.

Then, in the reinstalling method according to the present disclosure, when moving the object to be supported to the desired location, the support tools are detached one by one from the initially installed object to be supported to thereby release the supporting thereby. At this time, the load acting on at least one support tool, which is selected from the support tools being in a supporting state, is obtained. The selected at least one support tool may be plural or single, and further may be the support tool which is to be released. However, when taking into consideration the release of the support tool being performed by an operator and adjustment of the support tool at the time of subsequent reinstalling, it is more preferable that the selected support tool be single and be a support tool near the support to be released, and it is the most preferable that it be the support tool to be released itself. Thus, in the present disclosure, the supporting by the support tools is released while obtaining the load acting on a support tool being in a supporting state. Then, the release is ended at a point when the object to be supported is brought into a state of being supported by only the reference support tools, and thereafter, the object to be supported is moved to the desired location by predetermined means.

Subsequently, when the object to be supported is reinstalled at the same location as or a different location from that before the movement thereof, first, the object to be supported is supported by the at least three reference support tools so that the reference surface of the object to be supported is brought into the horizontal state immediately before the reference support tools were released, and then, the same positions of the object to be supported as those before the release are subsequently supported by the other support tools in a reverse order to the order of the release. At this time, for example, as for re-supporting of a certain position, based on the load value which was obtained about the selected support tool when the supporting of the certain position was released, the certain support tool is adjusted so that the detected load of the load cell of the selected support tool becomes the obtained load value. That is, the supported state of the object to be supported is restored to the state before the supporting thereof was released. In this manner, the supported state of the object to be supported is gradually restored in the reverse order to the order of the release, and finally the object to be supported is restored to the state before the supporting thereof was released and the reinstalling is finished.

Thus, according to the reinstalling method of the present disclosure, since the object to be supported is supported by the reference support tools so that the reference surface thereof is brought into the horizontal state immediately before the reference support tools were released, and then, each of the support tool is adjusted based on the load obtained about the selected support, which was selected at the time of the release of the support tool, the supported state of the object to be supported can be restored to the state before the support tools were released. Further, since the supported state of the object to be supported is gradually restored in a reverse order to that of the release, the object to be supported can be finally restored to the state before the supporting of the object to be supported was released. By virtue of this, the adjustment of each of the support tools is required to be performed only once at the time of supporting the object again by the support tool, and therefore a cumbersome operation of performing the adjustment by going or going back and forth around the object to be supported many times, which has been a conventional problem, is no longer required and the horizontal state obtained by taking time at the time of the initial installing can be reproduced precisely in a short period of time.

It is noted that, in the present disclosure, the load acting on the at least one selected support tool can be obtained from detected data of the load cell of the selected support tool in the state where the object to be supported is actually supported. By virtue of this, the value of the load of the selected support tool to be obtained when releasing each of the support tools can be easily obtained.

Alternatively, the load acting on the at least one selected support tool may be obtained in advance by structure analysis using a three-dimensional model of the object to be supported in each supported state. By virtue of this, it is not required to obtain data when releasing the supporting by the support tools, and therefore workload therefor can be reduced.

Further, the present disclosure relates to a method of, by using at least three support tools, as reference support tools, among a plurality of support tools, each of which is configured to be adjustable in a vertical-direction supporting position by an input torque from outside, releasing supporting of an object to be supported being in a state of being supported by the reference support tools and other support tools other than the reference support tools so that a predetermined reference surface thereof is in a horizontal state, and then reinstalling the object to be supported at a same location or a different location, wherein:

first, in a state before the supporting by the other support tools is released and in each of states in which the supporting by the other support tools is sequentially released one by one, a torque applied for adjusting at least one of the support tools selected from among the support tools being in a supporting state is obtained;

at the time of reinstalling the object to be supported, the object to be supported is supported at same positions as those before the release by the reference support tools so that the reference surface is brought into a horizontal state immediately before the reference support tools were released, and then the object to be supported is sequentially supported at same positions as those before the release by the other support tools in a reverse order to that of the release; and at the time of adjusting the vertical-direction supporting position of each of the support tools, the supporting position thereof is adjusted so that the torque applied to the selected support tool becomes a same value as the torque obtained in the supporting state before the support tool was released.

In this disclosure, the object to be supported is supported using the support tools configured to be adjustable in a vertical-direction supporting position by an input torque from outside, and, in the case of such support tools, the state of the load on each of the support tools can be found out by obtaining the torque input to the support tool for adjusting the supporting position thereof. Therefore, when the object to be supported is to be supported again by a certain one of the support tools, the object to be supported can be restored to the supported state before the release of the certain support tool by adjusting the supporting position of the certain support tool so that the torque applied to the selected support tool becomes the same value as the torque before the release. Thus, also in the reinstalling method based on input torque, as well as the above-described reinstalling method based on load, the supported state of the object to be supported is gradually restored in a reverse order to the order of the release, and the object to be supported is finally restored to the state before the supporting thereof is released.

Thus, according to this reinstalling method, since each of the support tools is adjusted based on the torque obtained with respect to the selected support tool at the time of the release thereof, the supported state of the object to be supported can be restored to the state before the supporting by the support tool was released. Further, since the supported state of the object to be supported is gradually restored in a reverse order to the order of the release, the object to be supported can eventually be restored to the state before the supporting thereof is released. Therefore, the adjustment of each of the support tools is required to be performed only once at the time of supporting the object again by the support tool, and the wasteful action of performing the adjustment by going or going back and forth around the object to be supported many times for final adjustment of the torque after the object is supported by all of the support tools, which has been a conventional problem, is no longer required, and the horizontal state obtained by taking time at the time of the initial installing can be reproduced precisely in a short period of time It is noted that the torque applied for adjusting the at least one selected support tool, that is, the torque input to the at least one selected support tool can be obtained from a torque acting on an adjustment jig immediately before the release of the supporting by the support tool is started by the adjustment jig in the state where the object to be supported is actually supported. By virtue of this, the value of the torque of the selected support tool to be obtained when the supporting by each of the support tool is released can be easily obtained.

Alternatively, the torque applied for adjusting the at least one selected support tool may be obtained in advance by structure analysis using a three-dimensional model of the object to be supported in each of the supported states thereof. By virtue of this, because an operation for obtaining data is not required to be performed when the supporting by each of the support tool is released, workload therefor can be reduced.

Further, in the present disclosure, the order of releasing the supporting by the other support tools is an order such that the release is started with an arbitrary one of the other support tools and then adjacent other tools are released one after another. By virtue of this, the distance of movement for the subsequent installing operation can be made small, and therefore the reinstalling operation becomes easy and the operation time therefor can be shortened.

As described above, according to the reinstalling method of the present disclosure, since, when the object to be supported is to be supported again using a certain one of the support tools, the certain support tool which is going to supporting the object to be supported again is adjusted so that the support tool selected when the supporting by the certain support tool was released indicates the load or torque obtained at the time of the release, the supported state of the object to be supported by each of the support tools can be restored to the state before the supporting by the support tool was released. Furthermore, since the supported state of the object to be supported is gradually restored in a reverse order to the order of the release, the object to be supported can be finally restored to the state before the supporting thereof was released.

Therefore, the adjustment of each of the support tools does not particularly require skills and is required to be performed only once at the time of supporting the object again by the support tool, the cumbersome operation of performing the adjustment by going or going back and forth around the object to be supported many times for final adjustment of the load after the object is supported by all of the support tools is no longer required, and the horizontal state obtained by taking time at the time of the initial installing can be reproduced precisely in a short period of time.

Further, besides reinstalling of a predetermined workpiece at the time of machining the workpiece, such as at the time of machining a bed for machine tool, and reinstalling of an industrial machinery, such as a machine tool, at the time of moving the industrial machinery, the reinstalling method according to the present disclosure can be preferably applied to reinstalling of an assembly product in an assembly line for assembling parts while sequentially changing the location such as, for example, an assembly line for a machine tool, and the like.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Figure 1:
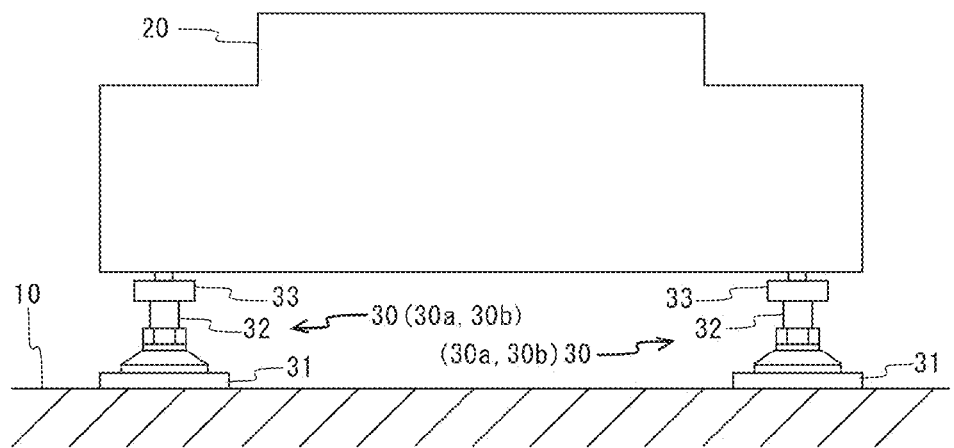
FIG. 1 is a front view showing a state where a workpiece is supported by support tools in a specific embodiment of the present disclosure.

Hereinafter, a method of reinstalling an object to be supported according to a specific embodiment of the present disclosure will be described with reference to the drawings. Note that, the reinstalling method according to this embodiment relates to, in a method of: as shown in FIG. 1, first, supporting a workpiece 20 as the object to be supported by means of a plurality of support tools 30 on a table 10 of a machine tool; machining the workpiece 20 supported in this manner by the machine tool; then detaching the machined workpiece 20 from the table 10 to measure the machining accuracy thereof by means of, for example, an external measurement device; and reinstalling the workpiece 20 on the table 10 of the machine tool after the measurement to perform corrective machining on the workpiece 20 based on the result of the measurement, a method of reinstalling the workpiece 20 on the table 10 after the detachment of the workpiece 20 from the table 10.

Figure 2:
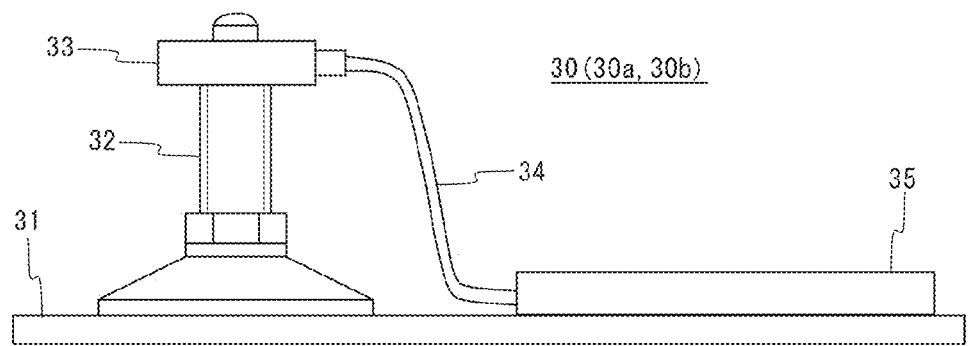
FIG. 2 is a front view showing the support tool used in the embodiment.
Figure 3:
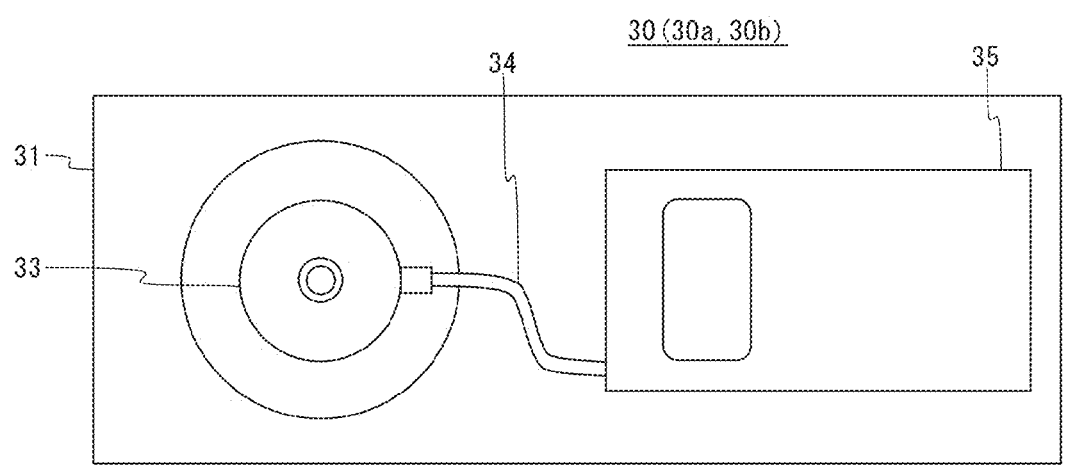
FIG. 3 is a plan view showing the support tool used in the embodiment.

Further, as shown in FIGS. 2 and 3, each support tool 30 used in this embodiment includes: a tabular base 31; a jack unit 32 disposed on the base 31 for adjusting the position of supporting in the vertical direction; a load cell 33 disposed on an upper end portion of the jack unit 32 for measuring the load acting on itself; a transmission cord 34 transmitting data on the load measured by the load cell 33; and a transmitter 35 receiving the load data from the load cell 33 via the transmission cord 34 and wirelessly transmitting the received load data. Although not particularly illustrated, the load data transmitted from the transmitter 35 is to be received by an appropriate receiver and displayed on a monitor of the receiver.

Initial Installing of Workpiece

Hereinafter, a method of initially installing the workpiece 20 on the table 10 of the machine tool will be described. First, the workpiece 20 is supported approximately horizontally by the support tools 30 which are disposed at three positions serving as references. Normally, supporting the object to be supported at four or more reference positions is not often performed since adjustment of the level (horizontal state) is difficult. Therefore, in this embodiment, a general case in which three positions serve as reference positions is described.

Figure 4:
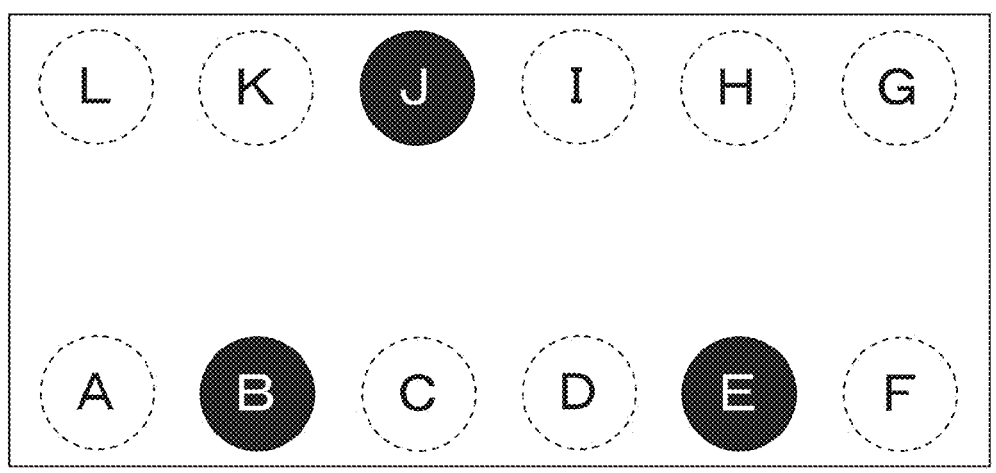
FIG. 4 is an illustration showing a supported state of the workpiece supported by three reference support tools in the embodiment.

FIG. 4 is an illustration showing a state where the workpiece 20, which is to be supported at 12 support positions A to L by the support tools 30, is supported by the support tools 30 positioned at the three reference positions B, E, and J (hereinafter, these support tools 30 are referred to as "reference support tools 30a"). Note that, in the drawing, in order to show that the workpiece is actually in a supported state at the reference positions, the reference positions B, E, and J are shown by black circles with white letters. Further, at the support positions A, C, D, F to I, K, and L shown by dotted-line circles, the support tools 30 (the support tools other than the reference support tools 30a and these support tools 30 are hereinafter referred to as "auxiliary support tools 30b") are disposed. However, load is not acting on the auxiliary support tools 30b, and the dotted-line circles indicate this state.

In the state shown in FIG. 4, the workpiece 20 is leveled (i.e., oriented horizontally) by adjusting the vertical-direction supporting positions of the reference support tools 30a, that is, the supporting positions of the jack units 32, disposed at the reference positions B, E, and J using a level so that a reference surface (for example, an upper surface) of the workpiece 20 becomes approximately horizontal. Note that, hereinafter, when using the term "the supporting position of the support tool 30", it is synonymous with the term "the supporting position of the jack unit 32".

Subsequently, the supporting positions of the auxiliary support tools 30b disposed at the support positions A, C, D, F to I, K, and L are adjusted as appropriate so that the reference surface of the workpiece 20 becomes horizontal, thereby applying an appropriate support load to the auxiliary support tools 30b. The appropriate support load largely depends on empirical intuitions of the operator. Therefore, at the time of the initial installing, the operator adjusts the supporting positions of the support tools 30*a* and 30*b* by going or going back and forth around the workpiece 20 so that an appropriate load acts on each of the support tools 30*a* and 30*b*. Note that, because the center of gravity of the workpiece 20 is not at the center thereof in many cases, and distortion, torsion, deflection, etc. occur on the workpiece 20 due to the supporting by the reference support tools 30*a* and the auxiliary support tools 30*b*, normally, the support load acting on the reference support tools 30*a* and the auxiliary support tools 30*b* is not uniform.

Figure 5:
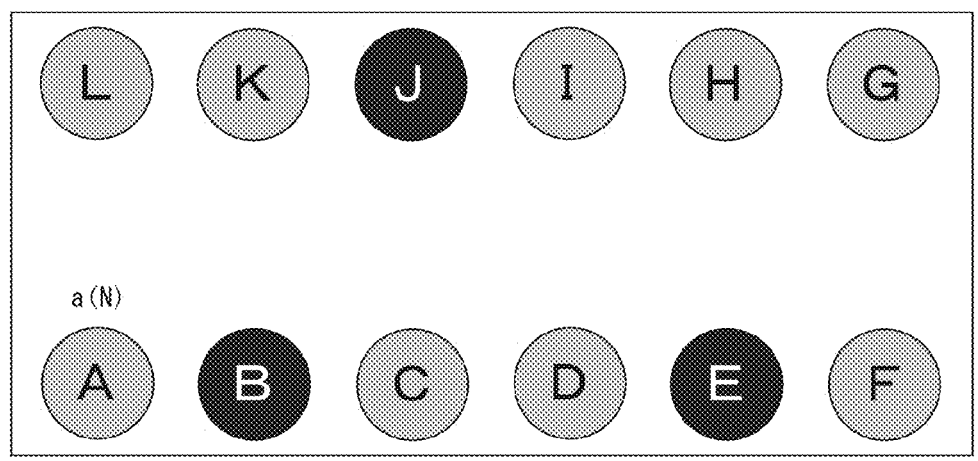
FIG. 5 is an illustration showing a supported state of the workpiece when initial installing has been completed in the embodiment.

FIG. 5 shows a state where an appropriate support load is applied to all of the reference support tools 30*a* and the auxiliary support tools 30*b* in this manner, thereby supporting the workpiece 20 by all of the reference support tools 30*a* and the auxiliary support tools 30*b*. Note that, in the drawing, the support positions A, C, D, F to I, K, and L are shown by solid-line circles and the insides of the circles are hatched in gray in order to show that support load is acting on the auxiliary support tools 30*b*.

Further, the support loads acting on the reference support tools 30*a* and the auxiliary support tools 30*b* are respectively detected by the load cells 33 provided thereon, and data on the detected loads are transmitted from each transmitter 35 to the receiver, which is held by the operator, and is displayed on the monitor of the receiver.

After the workpiece 20 is installed on the table 10 of the machine tool in the above-described manner, appropriate machining is performed on the workpiece 20. Then, after the machining, the workpiece 20 is detached from the table 10, and the machining accuracy thereof is measured by, for example, an external measurement device. After the measurement, the workpiece 20 is reinstalled on the table 10 of the machine tool and corrective machining is performed on the workpiece 20 based on the result of the measurement. Hereinafter, the detachment of the workpiece 20 from the table 10 and the reinstalling of the workpiece 20 onto the table 10 will be described.

Detachment of Workpiece

In this embodiment, when the workpiece 20 is to be detached from the table 10, the reference support tools 30*a* are left untouched, and the auxiliary support tools 30*b* are detached, in other words, released one by one. At this time, before a certain one of the auxiliary support tools 30*b* is released, data on the support load acting on this auxiliary support tool 30*b*, which is detected by the load cell 33 thereof and transmitted to the receiver, is read from the receiver and recorded. Thus, the auxiliary support tools 30*b* are sequentially released while the support load acting on the auxiliary support 30*b* to be released is obtained before the release, and eventually all of the auxiliary support tools 30*b* are released.

This is explained in more detail using FIGS. 5 to 8. Note that the auxiliary support tools 30*b* positioned at the support positions A, C, D, F to I, K, and L are to be released one by one in a counterclockwise order. First, when the auxiliary support tool 30*b* at the support position A is to be released in the state shown in FIG. 5, the load acting on this auxiliary support tool 30*b* is obtained from the data transmitted to the receiver and is recorded, and then the auxiliary support tool 30*b* at the support position A is released.

Figure 6:
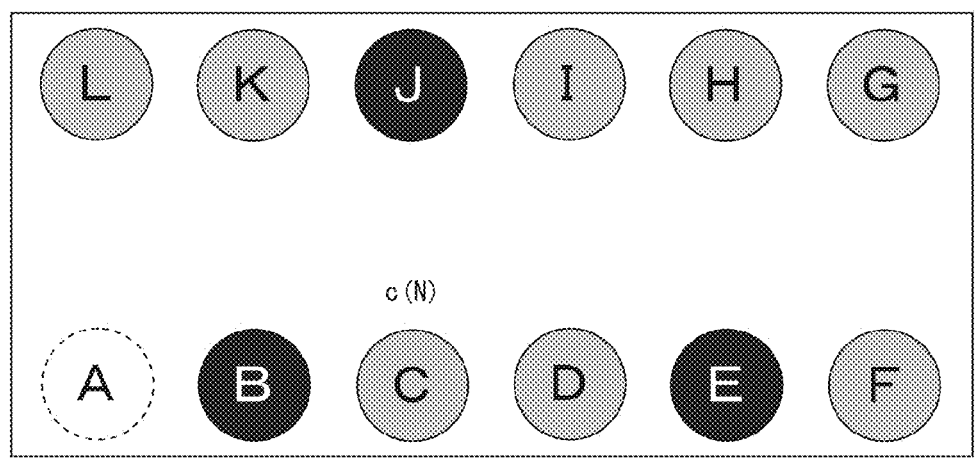
FIG. 6 is an illustration showing a supported state of the workpiece when only one support tool has been released in the embodiment.

FIG. 5 shows that, before the auxiliary support tool 30*b* at the support position A is released, load a (N (newton)) is acting on this auxiliary support tool 30*b*. Therefore, in this case, after the load a (N) acting on the auxiliary support tool 30*b* at the support position A is recorded and kept, the auxiliary support tool 30*b* at the support position A is released. Further, FIG. 6 shows a state where the auxiliary support tool 30*b* at the support position A has been released and shows that, before the auxiliary support tool 30*b* at the support position C is released after the release of the auxiliary support tool 30*b* at the support position A, load c (N) is acting on this auxiliary support tool 30*b*. Therefore, when the auxiliary support tool 30*b* at the support position C is to be released in the state shown in FIG. 6, the load c (N) acting on this auxiliary support tool 30*b* is recorded and kept, and then this auxiliary support tool 30*b* is released.

Figure 7:
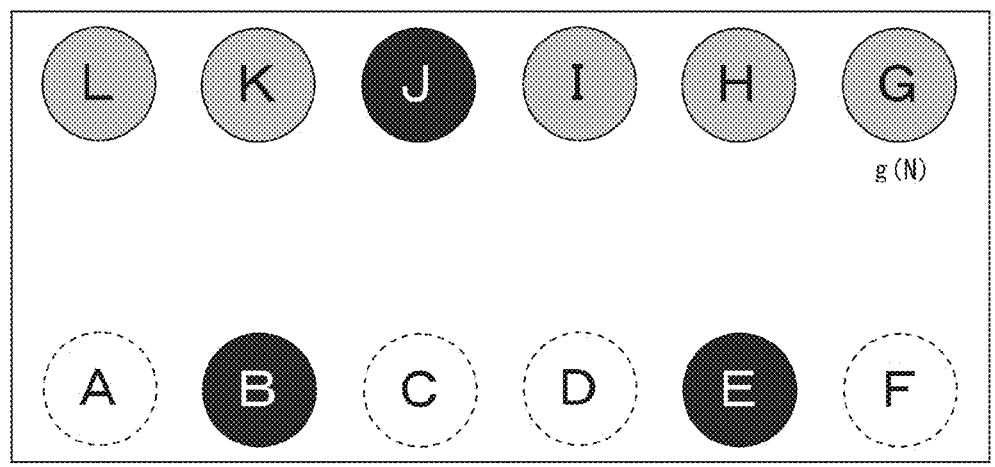
FIG. 7 is an illustration showing a supported state of the workpiece when four support tools have been released in the embodiment.

Thereafter, similarly, the auxiliary support tools 30*b* are sequentially released in the counterclockwise order. FIG. 7 shows a state in the middle of the release, wherein the auxiliary support tool 30*b* at the support position F has been released, and shows that, before the auxiliary support tool 30*b* at the support position G is released after the release of the auxiliary support tool 30*b* at the support position F, load g (N) is acting on this auxiliary support tool 30*b*. Therefore, when the auxiliary support tool 30*b* at the support position G is to be released, the load g (N) acting on this auxiliary support tool 30*b* is recorded and kept, and then this auxiliary support tool 30*b* is released.

Figure 8:
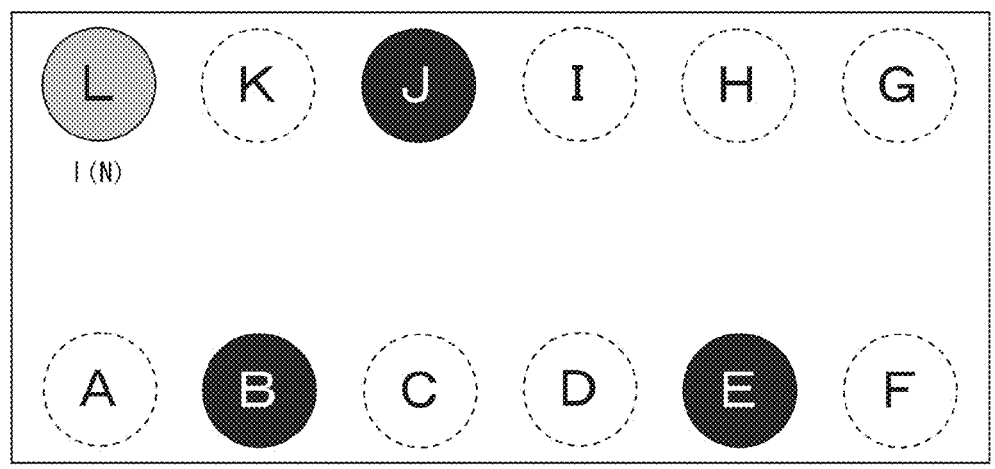
FIG. 8 is an illustration showing a supported state of the workpiece when eight support tools have been released in the embodiment.

After the auxiliary support tools 30*b* are sequentially released in this manner, as shown in FIG. 8, when the last auxiliary support tool 30*b* at the support position L is to be released, load (l(N)) acting on this last auxiliary support tool 30*b* is similarly obtained from the receiver and is recorded and kept, and then the last auxiliary support tool 30*b* is released.

Then, after all the supporting by the auxiliary support tools 30*b* is released, the workpiece 20 is removed from on the three reference support tools 30*a* and is loaded into an external measurement location. Thereafter, the workpiece 20 is installed on the table 10 again.

Reinstalling of Workpiece

At the time of reinstalling the workpiece 20, in this example, the workpiece 20 is reinstalled on the table 10 in a reverse procedure to that of detaching the workpiece 20 in the above-described manner. That is, first, after the three reference support tools 30*a* are respectively arranged on the support positions B, E, and J, the workpiece 20 is placed on the three reference support tools 30*a*. Then, using the level, level adjustment is performed by adjusting the supporting positions of the reference support tools 30*a* so that the reference surface of the workpiece 20 is brought into the horizontal state immediately before the reference support tools 30*a* were released.

Subsequently, as shown in FIG. 8, after the auxiliary support tool 30*b* is arranged on the support position L, the workpiece 20 is supported by adjusting the supporting position of this auxiliary support tool 30, and, while checking the load acting thereon by the receiver, the supporting position of this auxiliary support tool 30*b* is adjusted so that the load becomes the previously recorded load, that is, l(N). Through this operation, the supported state of the workpiece 20 is restored to the state before the auxiliary support tool 30*b* at the support position L was released.

Subsequently, after the auxiliary support tool 30*b* is arranged on the support position K, the workpiece W is supported by adjusting the supporting position of this auxiliary support tool 30*b*, and, while checking the load acting on this auxiliary support tool 30*b* by the receiver, the supporting position of this auxiliary support 30*b* is adjusted so that the load becomes the previously recorded load, thereby restoring the supported state of the workpiece 20 to the state before the auxiliary support tool 30*b* at the support position K was released.

Thereafter, similarly, while the auxiliary support tools 30*b* are sequentially arranged clockwise, that is, in the order of the support positions I, H, G, F, D, C and A, the supporting positions thereof are adjusted, thereby supporting the workpiece 20. The supporting position of each of the auxiliary support tools 30*b* is adjusted while checking the load acting thereon by the receiver so that the support load thereof becomes the previously recorded load, and thereby the supported state of the workpiece 20 is gradually restored to the state before the auxiliary support tools 30*b* were released, and, eventually, restored to the supported state before the support tools 30*a* and 30*b* were released, which is shown in FIG. 5.

As has been described in detail, in the reinstalling method of this embodiment, the supporting of the workpiece 20 by the auxiliary support tools 30*b* is sequentially released, and, when the supporting by a certain one of the auxiliary support tools 30*b* is to be released, the support load acting on this auxiliary support tool 30*b* is recorded in advance. On the other hand, when the workpiece 20 is to be supported again by the auxiliary support tools 30*b*, the workpiece 20 is supported by the auxiliary support tools 30*b* in the reverse order to the order of the release, and, when the workpiece 20 is to be supported by the certain one of the auxiliary support tools 30*b*, the supporting by this auxiliary support 30*b* is adjusted so that the support load acting on this auxiliary support tool 30*b* becomes the load recorded in advance.

Thus, according to the reinstalling method of this embodiment, since the supported state of the workpiece 20 is gradually restored in the reverse order to that of the release, the workpiece 20 can be precisely restored to the state before the release of the supporting of the workpiece 20. Further, when the workpiece 20 is to be supported again by the auxiliary support tools 30*b*, adjustment of the supporting position of each auxiliary support tool 30*b* is required to be performed only once, and therefore a cumbersome operation of performing the adjustment by going or going back and forth around the workpiece 20 many times, which has been a conventional problem, is not required, and the initial installing state can be reproduced precisely in a short period of time. Furthermore, since the supporting positions of the support tools 30*a* and 30*b* are adjusted based on the load values detected by the load cells 33, the operation does not require skills and the operation efficiency is not affected by the experience of the operator, or the like.

Thus, one embodiment of the present disclosure has been described. However, a specific mode in which the present disclosure can be realized is not particularly limited thereto.

For example, although, in the above-described embodiment, the workpiece 20 is supported using the support tools 30*a* and 30*b* provided with the load cells 33 and the supporting states of the support tools 30*a* and 30*b* are adjusted based on the support loads of the support tools 30*a* and 30*b* detected by the load cells 33, the present disclosure is not limited thereto and the workpiece 20 may be supported using support tools which are configured to be adjustable in the vertical-direction supporting position by an input torque from outside. In this case, in the above-described embodiment, the supporting state of each of the support tools is adjusted based on a torque value input to the support tool instead of the load value. Also in this reinstalling method using torque value, effects similar to those of the reinstalling method using load value are achieved. Note that, the torque input to the support tool can be obtained from an adjustment jig, such as a torque wrench, for operating the jack unit of the support tool.

Further, in the above-described embodiment, the value of the load acting on each of the support tools 30*a* and 30*b* (the same is applied to the torque), which is to be obtained when the supporting of the workpiece 20 is to be released, may be obtained by structure analysis using a three-dimensional model of the workpiece 20. In such a case, since no particular operation is required to be performed for obtaining data, the workload therefor can be reduced. Further, if data is obtained in advance by structure analysis in this manner, a procedure similar to the above-described reinstalling procedure can be employed also when initially installing the workpiece 20, and thereby precise installing can be realized in a short period of time also in the initial installing operation. Further, the operation does not require skills, and therefore the operation efficiency is not affected by the experience of the operator, or the like.

Furthermore, although, in the above-described embodiment, the order of releasing the auxiliary support tools 30*b* is the counterclockwise order, the order of releasing the auxiliary support tools 30*b* is not limited thereto and may be the clockwise order or another order. However, releasing adjacent auxiliary support tools 30*b* sequentially, such as the clockwise and counterclockwise orders, is preferred since the distance of movement of the operator is short.

Further, although, in the above-described embodiment, the detected loads of the load cells 33 of the support tools 30*a* and 30*b* are transmitted from the transmitters 35 to the predetermined receiver, each of the support tools 30*a* and 30*b* may be provided with an indicator, and the detected load of the load cell 33 may be displayed on the indicator. In such a case, since the support loads, which are displayed on the indicators, can be recorded before the auxiliary support tools 30*b* are released, the operation efficiency is good.

Further, although, in the above-described embodiment, when a certain one of the auxiliary support tools 30*b* is to be released, the support load acting on this auxiliary support tool 30*b* is obtained, the present disclosure is not limited thereto, and the support load acting on the auxiliary support tool 30*b* to be released next, another auxiliary support tool 30*b* other than that the above-mentioned ones, or one of the reference support tools 30*a* may be obtained as long as it is in a supporting state. Also in this case, when the workpiece 20 is to be reinstalled, the workpiece 20 is supported by the auxiliary support tools 30*b* in the reverse order to that of the release, and, when the workpiece 20 is to be supported again by a certain auxiliary support tool 30*b*, the supporting by this auxiliary support 30*b* is adjusted so that the support load acting on the auxiliary support tool 30*b* or reference support tool 30*a*, the load acting on which was recorded at the time of the release of the certain auxiliary support tool 30*b*, becomes the previously recorded load. Also in such a case, effects similar to those of the above-described embodiment are achieved.

Further, each of the support tools 30*a* and 30*b* of the above-described embodiment has the structure in which the load cell 33 is provided on the jack unit 32. However, the structure of the support tools 30*a* and 30*b* is not limited thereto. For example, each of the support tools 30*a* and 30*b* may be configured to support the workpiece 20 in a state where the jack unit 32 thereof is screwed into a female screw for level adjustment bored in the workpiece 20 and a lower end thereof is in contact with an upper surface of the load cell 33 placed on the base 31 thereof. Also in this case, similarly, the support load for supporting the workpiece 20 is applied to the load cell 33 via the jack unit 32 and the support load is detected by the load cell 33.

Furthermore, although, in the above-described embodiment, a workpiece to be machined by a machine tool is shown as an example of the object to be supported to be reinstalled, as a matter of course, the object to be supported is not limited thereto. As long as it is supported by the support tools, the object to be supported includes industrial machineries such as machine tools. Further, the reinstalling method according to the present disclosure can be also preferably applied to reinstalling of an assembly product in an assembly line for assembling parts while sequentially changing the location, such as an assembly line for a machine tool.

What is claimed is:

1. A reinstalling method of supporting an object to be supported with a plurality of support tools, each having a load cell for detecting a support load and configured to be adjustable in a vertical-direction supporting position, the plurality of support tools including at least three reference support tools and other support tools, the object to be supported being supported by the at least three reference support tools and the other support tools so that a predetermined reference surface of the object to be supported is brought into a horizontal state, and thereafter releasing the supporting of the object to be supported by the plurality of support tools and then supporting the object to be supported again with the plurality of support tools at a same location or a different location, the method comprising:

at the time of releasing the supporting of the object to be supported by the plurality of support tools, the supporting by the other support tools is first released sequentially one by one, and in a support state before the release of the supporting by the other support tools and in each support state after each of the sequential release of the supporting by the other support tools, a load acting on at least one support tool selected from among the plurality of support tools being then supporting the object to be supported is obtained;

after the supporting by the other support tools is completely released, the supporting by the at least three reference support tools is released;

at a time of reinstalling the object to be supported, the object to be supported is first supported again by the at least three reference support tools at same positions as before the release of the supporting by the at least three reference support tools so that the reference surface of the object to be supported is brought into a same horizontal state as that immediately before the release of the supporting by the at least three reference support tools;

thereafter, the object to be supported is supported again sequentially by the other support tools at same positions as before the release of the supporting by the other support tools in an order reverse to that when the supporting by the other support tools was released; and at a time of adjusting the vertical-direction supporting position of each of the other support tools sequentially caused to support the object to be supported again, the supporting position of a support tool to be adjusted is adjusted so that the load cell of the at least one support tool selected at the time of the release of the supporting by the support tool to be adjusted detects a same value as the load obtained in the support state before the release of the supporting by the support tool to be adjusted, thereby restoring the support state before the release of the supporting by the plurality of support tools.

2. The reinstalling method according to claim 1, wherein, in each support state, the load acting on the at least one support tool selected is obtained from data actually obtained by the load cell of the at least one support tool.

3. The reinstalling method according to claim 1, wherein the order when the supporting by the other support tools is released is an order starting with an arbitrary one of the other support tools and then sequentially proceeding to adjacent other support tools.

4. A reinstalling method of supporting an object to be supported with a plurality of support tools, each configured to be adjustable in a its vertical-direction supporting position based on a torque input from outside using an adjustment jig, the plurality of support tools including at least three reference support tools and other support tools, the object to be supported being supported by the at least three reference support tools and the other support tools so that a predetermined reference surface of the object to be supported is brought into a horizontal state, and thereafter releasing the supporting of the object to be supported by the plurality of support tools and then supporting the object to be supported again with the plurality of support tools at a same location or a different location, the method comprising:

at the time of releasing the supporting of the object to be supported by the plurality of support tools, the supporting by the other support tools is first released sequentially one by one, and in a support state before the release of the supporting by the other support tools and in each support state after each of the sequential release of the supporting by the other support tools, a torque applied for adjusting at least one support tool selected from among the plurality of support tools being then supporting the object to be supported is obtained;

after the supporting by the other support tools is completely released, the supporting by the at least three reference support tools is released;

at a time of reinstalling the object to be supported, the object to be supported is first supported again by the at least three reference support tools at same positions as before the release of the supporting by the at least three reference support tools so that the reference surface of the object to be supported is brought into a same horizontal state as that immediately before the release of the supporting by the at least three reference support tools;

thereafter, the object to be supported is supported again sequentially by the other support tools at same positions as before the release of the supporting by the other support tools in an order reverse to that when the supporting by the other support tools was released; and at a time of adjusting the vertical-direction supporting position of each of the other support tools sequentially caused to support the object to be supported again, the supporting position of a support tool to be adjusted is adjusted so that the torque applied to the at least one support tool selected at the time of the release of the supporting by the support tool to be adjusted becomes a same value as the torque obtained in the support state before the release of the supporting by the support tool to be adjusted, thereby restoring the support state before the release of the supporting by the plurality of support tools.

5. The reinstalling method according to claim 4, wherein the at least one support tool selected is to be released next, and, in each support state, the torque applied for adjusting the at least one support tool selected is obtained, by using the adjustment jig, from a torque actually acting on the adjustment jig immediately before the release of the supporting by the at least one support tool selected is started.

6. The reinstalling method according to claim 4, wherein the order when the supporting by the other support tools is released is an order starting with an arbitrary one of the other support tools and then sequentially proceeding to adjacent other support tools.

\* \* \* \* \*